United States Patent

Gustafson

[15] 3,673,323

[45] June 27, 1972

[54] STORAGE DISPLAY SYSTEM

[72] Inventor: Charles H. Gustafson, Manitou Springs, Colo.

[73] Assignee: Hewlett-Packard Company, Palo Alto, Calif.

[22] Filed: Sept. 23, 1970

[21] Appl. No.: 74,764

[52] U.S. Cl. ..........................178/6.8, 178/DIG. 24, 315/19

[51] Int. Cl. ..........................H01j 31/60

[58] Field of Search ..........................315/11, 12, 10, 13, 13 ST, 315/24, 19; 178/6.8, DIG. 24

[56] References Cited

UNITED STATES PATENTS

| | | | |
|---|---|---|---|
| 2,922,070 | 1/1960 | Seevers | 315/13 R |
| 3,309,560 | 3/1967 | Popodi | 315/24 |
| 3,569,770 | 3/1971 | Gustafson et al. | 315/12 |
| 3,459,888 | 8/1969 | Sorolov | 178/6.8 |
| 2,743,378 | 4/1956 | Covely et al. | 315/12 |
| 3,381,277 | 4/1968 | Stansby | 178/6.8 |

*Primary Examiner*—Robert L. Griffin
*Assistant Examiner*—Joseph A. Orsino, Jr.
*Attorney*—A. C. Smith

[57] ABSTRACT

A cathode ray tube display is combined with a scan converter tube, a raster generator, a comparator and control circuit to provide a storage display system in which a selected portion of the display can be erased while simultaneously displaying information written on the unselected portion of the display. An adder circuit adds a selected amount of the horizontal sweep to the vertical sweep of the read raster and adds a selected amount of the vertical sweep to the horizontal sweep of the read raster to skew the read raster with respect to the display raster and thereby correct alignment defects in the scan converter tube.

2 Claims, 2 Drawing Figures

INVENTOR.
CHARLES H. GUSTAFSON

STORAGE DISPLAY SYSTEM

BACKGROUND OF THE INVENTION

Certain known storage display systems use a scan converter tube to convert an electrical signal (herein called a video signal) into a visual display, to store the visual display in a storage mesh and to reconstruct the visual display into another video signal. This reconstructed video signal is applied to the video input of a cathode ray tube (CRT) display. The display raster for the CRT and the read raster for the scan converter tube are produced by horizontal and vertical sweep signals from a raster generator.

Typically, a portion of a display is erased by increasing the potential voltage of the storage mesh and by changing the size of the raster produced by the raster generator to encompass that portion of the display to be erased. One disadvantage of this type of selective erasure is that information stored on the remaining portion of the storage mesh cannot be displayed while a selected portion is being erased.

In reconstructing a video signal from a stored visual display, electron gun misalignment in the scan converter may cause a resultant CRT display to be skewed or rotated with respect to the stored display. Stray magnetic fields within the scan converter tube may also have a rotational effect upon a resultant CRT display.

SUMMARY OF THE INVENTION

The present invention provides an improved scan converter/cathode ray tube storage display system that compares vertical and horizontal sweep signals from a raster generator with external signal levels and provides an output signal when these sweep signals are within limits defined by the external signal levels. The output signal can be used to intensify the CRT display when the sweep signals are within the limits, to erase the portion of the display within the limits while reading the remaining portion of the display or to erase the portion of the display outside the limits while reading the remaining portion of the display.

The display raster and read raster can be skewed with respect to each other by adding a selected amount of the horizontal sweep signal of one of the rasters to the vertical sweep signal of that raster and by adding a selected amount of the vertical sweep signal of the same raster to the horizontal sweep signal of that raster. This reduces the effects of gun misalignment and stray magnetic fields upon a resultant display.

DESCRIPTION OF THE PREFERRED EMBODIMENT

Figure 1:
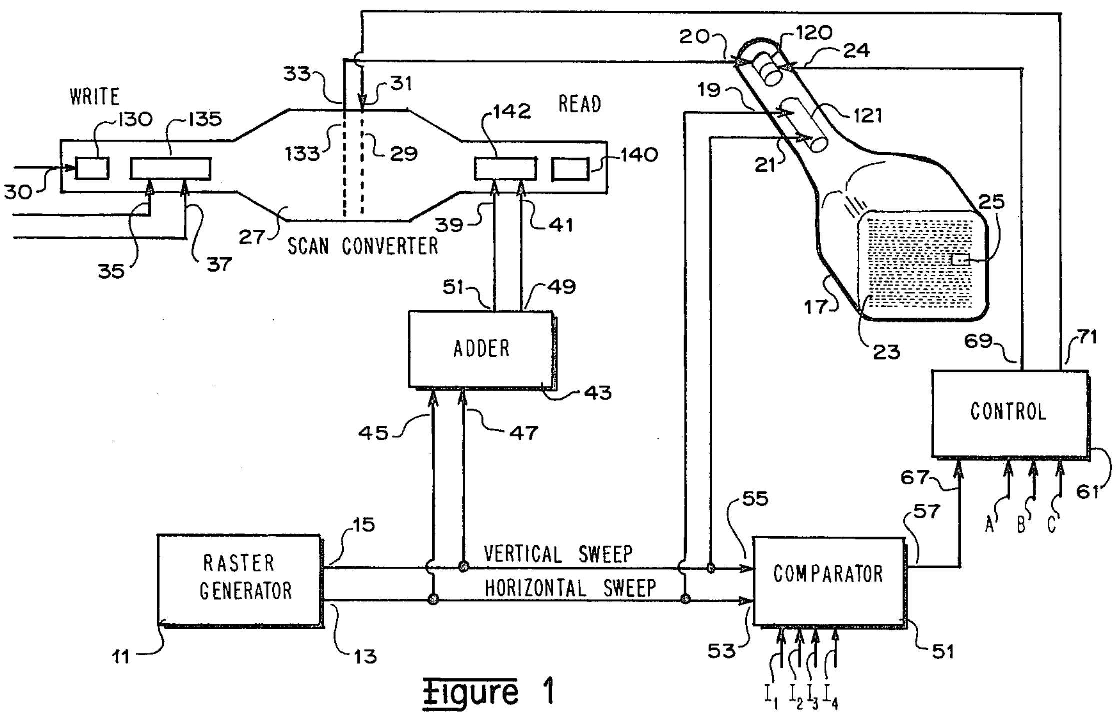
FIG. 1 is a block diagram of the preferred embodiment of the scan converter/cathode ray tube storage display apparatus.

Referring now to FIG. 1 there is shown the improved scan converter/CRT storage display system of the present invention. CRT display 17 has a video signal input 20 to electron gun 120, horizontal sweep input 19 and vertical sweep input 21 to electron beam deflector 121 and an intensity control input 24. A signal applied at input 24 increases the current in an electron beam in the display 17 and thereby intensifies any portion of the display that the electron beam traverses while the signal is applied.

Raster generator 11 has a horizontal sweep output 13 connected to input 19 of display 17 and a vertical sweep output 15 connected to input 21 of display 17 to produce a display raster 23. The horizontal sweep output 13 is also connected to input 45 of added 43 and input 53 of comparator 51. The vertical sweep output 15 is also connected to input 47 of adder 43 and input 55 of comparator 51.

Although this description is based on a double-ended (two-gun) scan converter, the principles disclosed are applicable to single-ended (one gun) converters. Video information is stored on a storage mesh 29 within the converter 27 by applying a video signal to input 30 connected to write electron gun 130. The video signal is synchronized with horizontal and vertical sweep signals applied respectively to inputs 35 and 37 connected to electron beam deflector 135. The image stored on the mesh 29 is reconstructed to a video signal by an electron beam from electron gun 140 that is directed across the face of storage mesh 29 by horizontal and vertical sweep signals applied respectively at inputs 39 and 41 to electron beam deflector 142. These sweep signals produce a read raster. The video signal from collector electrode 133 produced is provided at output 33 which is connected to input 20 of CRT display 17. A signal applied at input 31 increases the voltage on storage mesh 29 and as an electron beam from electron gun 140 within the converter is directed to points on the storage mesh 29 while it is at an increased potential, information stored thereon is erased.

Conventional adder 43 adds a selected amount of horizontal sweep signal to the vertical sweep signal of the raster generator 11 and applies the new vertical sweep signal to input 41 of converter 27. Adder 43 also adds a selected amount of the vertical sweep signal to the horizontal sweep signal of the raster generator 11 and applies the new horizontal sweep signal to input 39 of converter 27. This causes the read raster to be rotated, skewed i.e., nonrectangular in shape) or both with respect to the display raster. The amount of rotation and skew is proportional to the amount of one signal added to the other. The effects of electron gun misalignment and stray magnetic fields within a scan converter may be reduced by rotating and/or skewing the read raster with respect to the display raster.

Comparator 51 has inputs 53 and 55 connected to outputs 13 and 15 of raster generator 11. The comparator 51 compares the horizontal sweep signal to signal levels applied at inputs $I_3$ and $I_4$ and simultaneously compares the vertical sweep signal to signal levels applied at inputs $I_1$ and $I_2$. When the sweep signals are within the limits established by signal levels at inputs $I_1$14 $I_4$, a positive or "high" output signal occurs at the output 57 of comparator 51, otherwise there is a zero or "low" signal. Output 57 is connected to input 67 of control 61.

Control 61 consists of a number of logic gates and has an output 69 connected to input 24 of CRT display 17 and an output 71 connected to input 31 of scan converter 27. A signal appearing at input A and a "high" signal at input 67 of control 61 causes a signal to occur at output 69. This signal increases the current in the electron beam within display 17 and intensifies a portion 25 of the display raster 23 that is determined by the signal levels applied at inputs $I_1$–$I_4$ of comparator 51.

A signal appearing at input B and a "high" signal at input 67 of control 61 causes a signal to occur at output 71. This signal increases the potential voltage of storage mesh 29 and causes an area of the storage mesh to be erased when an electron beam traverses the area. The area erased corresponds to that portion 25 of display 17 that is illuminated by a signal at input A and at input 67.

A signal appearing at input C and a "low" signal at input 67 of control 61 also causes a signal to occur at output 71. Therefore the storage mesh 29 will be at an increased potential until the horizontal and vertical sweep signals come within limits established by signal levels at inputs $I_1$–$I_4$, and only an area of the storage mesh defined by these limits will be unaffected when an electron beam is swept across the storage mesh.

Therefore, with the present invention a portion of a display can be illuminated or erased while simultaneously reading the remaining portion of the display.

Figure 2:
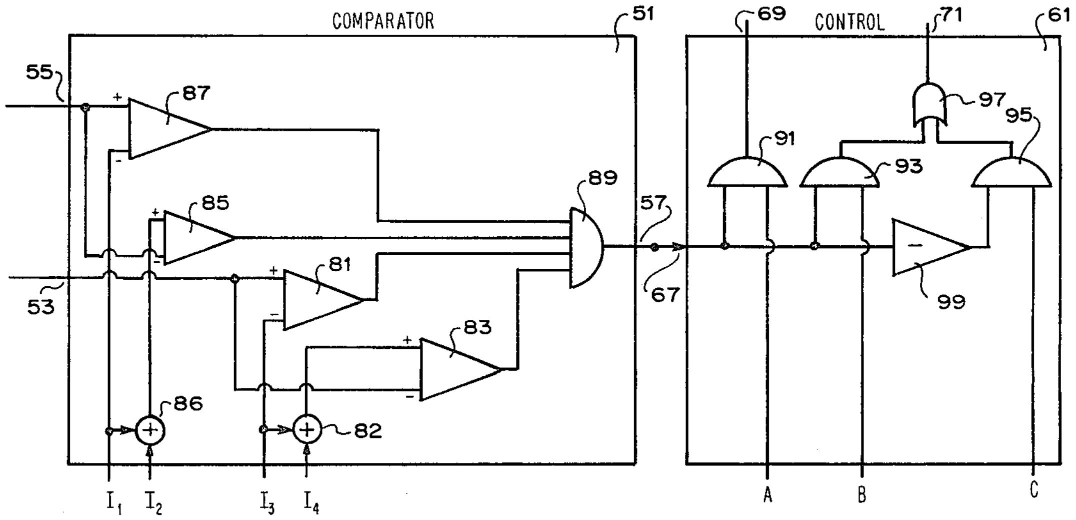
FIG. 2 is a detailed block diagram of the control and comparator apparatus shown in FIG. 1.

FIG. 2 shows a detailed block diagram of comparator 51 and control 61. As shown in this embodiment of comparator 51, inputs $I_1$–$I_4$ define a rectangular region 25 of the display raster. $I_1$ represents the vertical position of the bottom of the rectangle, $I_2$ represents the vertical size, $I_3$ represents the left hand side position, and $I_4$ represents the horizontal size. A differential amplifier 87 compares the signal level at input $I_1$ with the vertical sweep signal and gives a positive output when the sweep is above the line defined by $I_1$. The signal levels at $I_1$ and $I_2$ are added in an adder 86 and the resultant signal is compared with the vertical sweep signal in a differential amplifier 85. Amplifier 85 gives a positive output when the vertical sweep is below the top line of the rectangle represented by portion 25 of display 17. In a similar fashion the horizontal sweep signal on input 53 is compared with the signal levels at $I_3$ and $I_4$ by amplifiers 81 and 83, and adder 82. The outputs of amplifiers 81, 83, 85 and 87 are fed to AND gate 89, which gives a "high" output signal when the output signals of all four amplifiers are positive, indicating that the electron beam of display 17 is within portion 25 defined by the signal levels at $I_1$–$I_4$. The output of AND gate 89 is "low" if one or more of its inputs is not positive.

Control 61 comprises AND gates 91, 93 and 95, and OR gate 97 and an inverter 99. AND gate 91 gives a signal at output 69 when there is a signal on input A and a "high" signal on input 67. AND gate 93 gives an output signal to OR gate 97 when there is a signal on input B and a "high" signal on input 67 and AND gate 95 gives an output signal to OR gate 97 when there is a signal on input C and the output of inverter 99 is "high" (i.e. the signal on input 67 is "low"). There is a signal on output 71 whenever there is a signal on either input of OR gate 97.

I claim:

1. Storage display apparatus comprising:

a cathode ray tube (CRT) display having a video signal input, horizontal and vertical sweep inputs for controlling an electron beam deflection in response to signals applied thereto and having an intensity control input for adjusting the current in the electron beam to intensify the illumination of a portion of the display in response to a signal applied thereto;

raster generator means having a first raster output connected to the horizontal sweep input of said CRT display for providing a horizontal sweep signal thereto and having a second raster output connected to the vertical sweep input of said CRT display for providing a vertical sweep signal thereto;

scan converter means including an electron gun and electron beam deflection means having horizontal and vertical sweep inputs for controlling the deflection of an electron beam from the gun, a storage mesh, an output for producing a video signal and an erase input for changing the voltage on said storage mesh in response to a signal applied thereto;

connecting means for connecting the first and second raster outputs to the horizontal and vertical sweep inputs of said scan converter deflection means;

means connecting the output of said scan converter to the video signal input of said CRT display;

comparator means having first, second, third and fourth control inputs, first and second raster inputs connected respectively to the first and second raster outputs, and an output, signals on the first and second control inputs establishing a first amplitude range and signals on the third and fourth control inputs establishing a second amplitude range, said comparator means producing first output signal in response to the signal amplitude on the first raster input being within the first amplitude range and the signal amplitude on the second raster input being within the second amplitude range, and producing a second output signal otherwise; and control means having a plurality of inputs, a first of said plurality of inputs being connected to the output of said comparator means, and having an output connected to the erase input of the scan converter means for providing a signal thereto in response to either (a) a first signal at another of said plurality of inputs and said first output signal at the first input, or (b) a second signal at another of said plurality of inputs and said second output signal at the first input, said control means including a second output connected to the intensity control input of the CRT display for providing a signal thereto in response to a signal at still another of said plurality of inputs and said first output signal at the first input.

2. Storage display apparatus comprising:

a cathode ray tube (CRT) display having a video signal input, horizontal and vertical sweep inputs for controlling an electron beam deflection in response to signals applied thereto and having an intensity control input for adjusting the current in the electron beam to intensify the illumination of a portion of the display in response to a signal applied thereto;

raster generator means having a first raster output connected to the horizontal sweep input of said CRT display for providing a horizontal sweep signal thereto and having a second raster output connected to the vertical sweep input of said CRT display for providing a vertical sweep signal thereto;

scan converter means including an electron gun and electron beam deflection means having horizontal and vertical sweep inputs for controlling the deflection of an electron beam from the gun, a storage mesh, an output for producing a video signal and an erase input for changing the voltage on said storage mesh in response to a signal applied thereto;

connecting means for connecting the first and second raster outputs to the horizontal and vertical sweep inputs of said scan converter deflection means, said connecting means including adder means having a first and second input connected to the first and second raster outputs and having a first output connected to the horizontal sweep input of said scan converter means for providing a signal thereto proportional to a signal at said first input and a selected amount of a signal at said second input and having a second output connected to the vertical sweep input of said scan converter means for providing a signal thereto proportional to a signal at said second input and a selected amount of a signal at said first input;

means connecting the output of said scan converter to the video signal input of said CRT display;

comparator means having first, second, third and fourth control inputs, first and second raster inputs connected respectively to the first and second raster outputs, and an output, signals on the first and second control inputs establishing a first amplitude range and signals on the third and fourth control inputs establishing a second amplitude range, said comparator means producing first output signal in response to the signal amplitude on the first raster input being within the first amplitude range and the signal amplitude on the second raster input being within the second amplitude range, and producing a second output signal otherwise; and control means having a plurality of inputs, a first of said plurality of inputs being connected to the output of said comparator means, and having an output connected to the erase input of the scan converter means for providing a signal thereto in response to either (a) a first signal at another of said plurality of inputs and said first output signal at the first input, or (b) a second signal at another of said plurality of inputs and said second output signal at the first input, said control means including a second output connected to the intensity control input of the CRT display for providing a signal thereto in response to a signal at still another of said plurality of inputs and said first output signal at the first input.

* * * * *